United States Patent [19]

Bozzo

[11] Patent Number: 5,724,744

[45] Date of Patent: Mar. 10, 1998

[54] SELF-LEVELING DEVICE MOUNTED ON A ROTATING BASE FOR PROJECTING LASER RAYS

[75] Inventor: Mario Doriguzzi Bozzo, Milan, Italy

[73] Assignee: Micro Italiana S.p.A., Arzignano, Italy

[21] Appl. No.: 614,350

[22] Filed: Mar. 12, 1996

Related U.S. Application Data

[63] Continuation-in-part of Ser. No. 223,698, Apr. 6, 1994, abandoned.

[30] Foreign Application Priority Data

Apr. 7, 1993 [IT] Italy ................... VI93A0050

[51] Int. Cl.⁶ ........................... G01C 1/00; G01C 5/00
[52] U.S. Cl. ...................... 33/291; 33/DIG. 21; 356/250
[58] Field of Search ..................... 33/276, 277, 283, 33/285, 291, DIG. 21; 356/250, 248, 149

[56] References Cited

U.S. PATENT DOCUMENTS

| | | | |
|---|---|---|---|
| 3,588,249 | 6/1971 | Studebaker | 33/DIG. 21 |
| 3,771,876 | 11/1973 | Ljungdahl et al. | 33/291 |
| 3,807,869 | 4/1974 | Hartley | 33/291 |
| 3,856,409 | 12/1974 | Cindrich et al. | 33/291 |
| 3,858,984 | 1/1975 | Denton et al. | 356/250 |
| 4,183,667 | 1/1980 | Denton | 356/250 |
| 4,448,528 | 5/1984 | McManus | 356/250 |
| 4,993,161 | 2/1991 | Borkovitz | 33/291 |
| 5,144,487 | 9/1992 | Hersey | 356/138 |
| 5,212,889 | 5/1993 | Lysen | 33/291 |
| 5,218,770 | 6/1993 | Toga | 33/276 |
| 5,331,395 | 7/1994 | Piske et al. | 33/DIG. 21 |

FOREIGN PATENT DOCUMENTS

| | | | |
|---|---|---|---|
| 0258108 | 11/1986 | Japan | 333/DIG. 21 |
| 0004114 | 1/1991 | Japan | 33/277 |

Primary Examiner—Thomas B. Will
Attorney, Agent, or Firm—Bucknam and Archer

[57] ABSTRACT

The projector device for laser rays (4) is mounted on an apparatus which oscillates and is self-leveling (2, 3, 5) under the force of gravity whereby in the equilibrium position a ray is projected on one or more walls always in a perfectly horizontal position. The oscillating apparatus is interrupted in its oscillations by a manual mechanical brake (6, 7, 8 and 9). The device can rotate and includes a graduated ringnut (11) on which it is possible to read the angle of rotation of the laser ray with respect to a predetermined reference point.

1 Claim, 5 Drawing Sheets

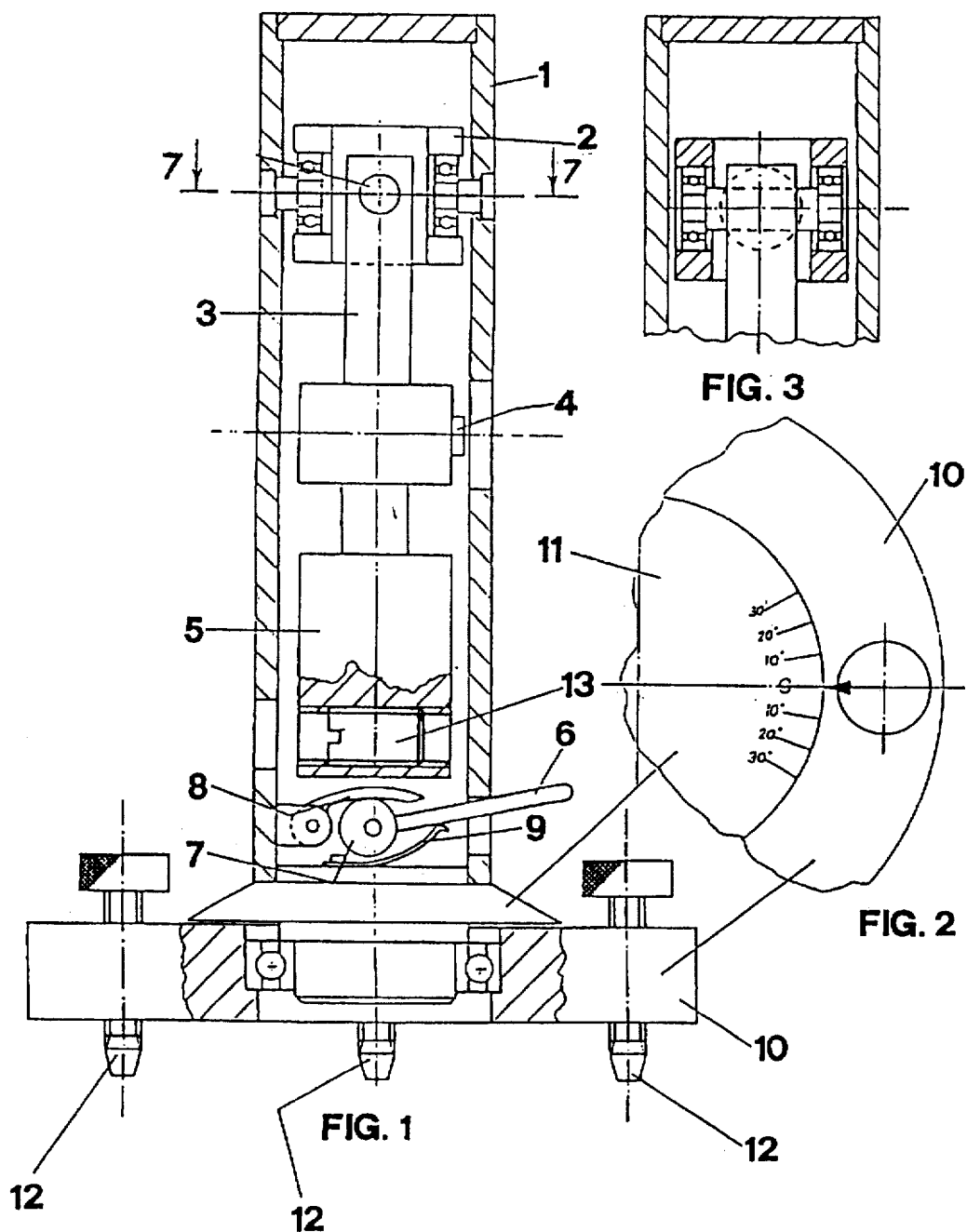

5,724,744

SELF-LEVELING DEVICE MOUNTED ON A ROTATING BASE FOR PROJECTING LASER RAYS

CROSS-REFERENCES TO RELATED APPLICATIONS

This application is a Continuation-In-Part of U.S. Ser. No. 08/223,698, filed Apr. 6, 1994 now abandoned.

FIELD OF THE INVENTION AND SUMMARY OF THE INVENTION

The present invention relates to projectors and more particularly to a projector capable of projecting a laser ray on a wall in a visible and stationary manner, and always perfectly horizontal, directly or deviated by 90° through a prism. The laser ray is emitted by an emitting device mounted on an oscillating equipment which is self-leveling under the force of gravity and the oscillations of which are interrupted.

The device according to the present invention also includes a rotating base so that when it is moved manually or in an automated manner, it is possible to project the laser ray in different directions but always in a rigorously horizontal position.

The self-leveling effect does not require mounting the apparatus on a perfectly horizontal supporting plane but permits the normal positioning of the apparatus on a plane which need only be approximately horizontal.

BRIEF DESCRIPTION OF THE DRAWINGS

The invention is illustrated by reference to the accompanying drawings, in which:

FIG. 1 is an elevational front view in cross section of the device according to the present invention, according to a first embodiment;

FIG. 2 is an enlarged planar view of a part of the ringnut of the base with suitable notations for the purpose of measuring the angle of rotation;

FIG. 3 illustrates a partial side view of the device in cross section;

DESCRIPTION OF THE PREFERRED EMBODIMENT

Figure 4:
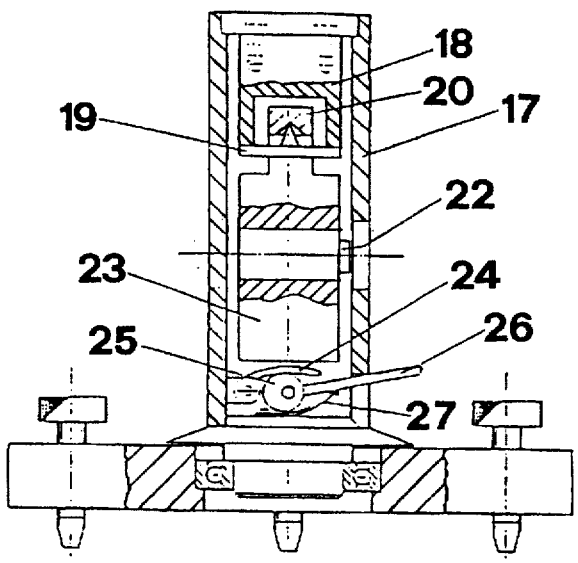
FIG. 4 illustrates an elevational front view in cross section of a second embodiment of the invention.
Figure 6:
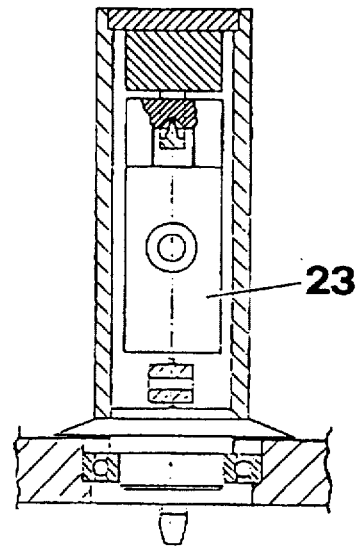
FIG. 6 is an elevational side view in cross section of the device of FIG. 4.
Figure 5:
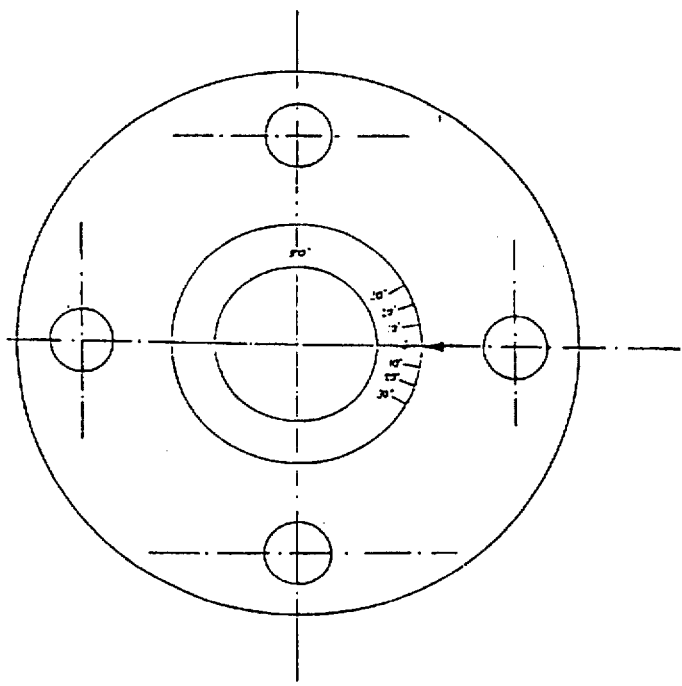
FIG. 5 is a planar view of the ringnut of the base of the device according to FIG. 4.

As shown in FIG. 1, the device consists of a sleeve (1) within which is disposed the universal joint (2) formed in a conventional manner on bearings or bushings or with a system comprising wedges and shafts. The universal joint supports the oscillating stem (3) which carries in an orthogonal direction the emitting device (4) of the laser rays which is fed with a battery or other suitable source and ends in the lower part with the weight (5).

Obviously, means equivalent to the means described hereinabove, such as an emitting device placed vertically on the axis of the weight (5) and provided with a prism which deviates the laser ray by 90° in the horizontal direction, could be used.

For the purpose of finding the exact self-leveling position, the weight (5) performs oscillations prior to stopping. There may be provided a means which can be mechanical, manual, electrical, or magnetic for the purpose of interrupting the oscillations in order to rapidly stop the oscillations of the weight (5).

The stem (3), the emitting apparatus (4) and the weight (5) form a rigid assembly which freely oscillates by means of the universal joint (2) and the center of gravity is disposed in the rest position exactly on the vertical line of the center of the universal joint.

In order to ensure that the laser ray be perfectly horizontal independently from the constructive or geometrical characteristics of the oscillating group, there is provided a regulating device shown in FIG. 1 formed for instance by means of a screw (13) which is located in the weight (5). The screw (13), by suitable displacement by screwing, influences with its mass the position of the group stem-emitting apparatus-weight in such a manner that such a position of the same group is achieved that the laser ray is projected perfectly horizontal.

The device which comprises the screw (13) may be made by way of a non-limiting example with a metallic cylinder which is braked and/or by addition of suitable weights. For the purpose of finding the exact self-leveling position, the weight (5) performs some oscillations prior to stopping and there may be provided a means for interrupting the oscillations which may be electrical, magnetic, capacitive, mechanical, or manual in order to rapidly achieve stopping of the weight (5).

A mechanical means for stopping weight (5) is shown in FIG. 1 consisting of a lever (6) which is manually operated and which causes cam (7) to rotate. The cam raises the blade (8) which touches and brakes the weight (5) thereby interrupting the oscillating movement of the weight. Upon release of lever (6), a spring (9) biases lever (6) to disengage blade (8) from weight (5). By one or a series of such interruptions in the oscillations of weight (5), a dampening effect results.

In view of the fact that the device rests on the base (10) which can be leveled to an approximate horizontal position by adjustment of adjustment screws (12) and which permits the rotation of the sleeve (1), it is possible by means of a simple manual rotation to pinpoint directly on one or more walls which are placed around the device several points which all lie on the same horizontal plane. It is also possible by means of a graduated ringnut (11) to project on the walls a ray which is angularly displaced by a determined angle with respect to a reference point, the angle being legible in the visible graduation shown in FIG. 2.

According to the embodiment shown in FIG. 4, there is provided a sleeve (17) which carries integrally therewith the block (18). The latter is provided with a crosspiece (19) which has a central upwardly directed conical part. The crosspiece (20) rests on this part. The crosspiece (20) has a conical lower part of width greater with respect to the conjugated lower point of the weight (23), integrally arranged therewith. The device which emits the laser ray (22) is mounted on the weight (23), this device being disposed with its axis orthogonal with respect to the vertical axis of the oscillating weight (23).

The oscillations of the weight (23) may be effectively dampened by the interruptions in oscillation caused by the blade (24) which is raised by cam (25), the latter being placed in rotation manually by the lever (26) when the latter is lowered.

The spring (27) biases the lever (26) to a normally raised position so that blade (24) is normally out of contact with weight (23). When manual pressure is released from lever (26), the blade (24) is lowered and the weight (23) is released. By holding or maintaining the lever (26) lowered, in view of the particular shape of cam (25), the weight (23) is raised and pushed against the block (18) so as to prevent any motion of the block to permit transportation of the device without damage.

Figure 7:
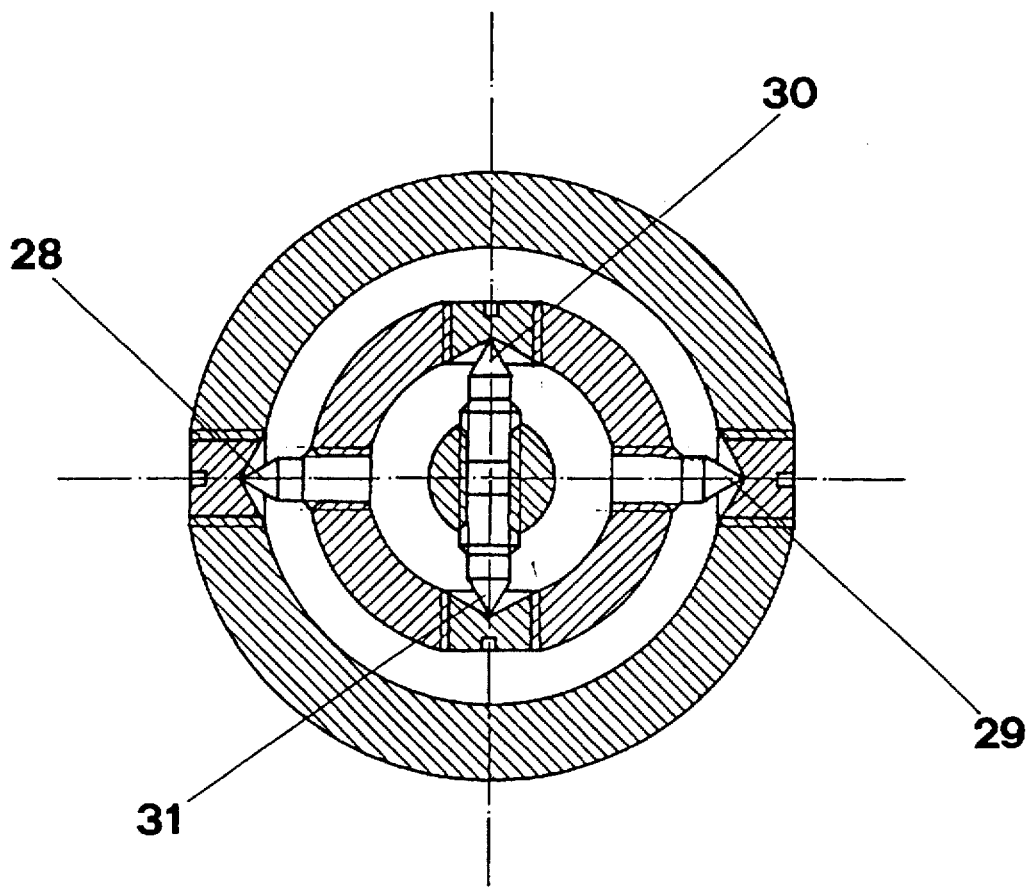
FIG. 7 is a view of the spider which supports the device operating as a pendulum in cross-section taken along line 7—7 in FIG. 1.
Figure 8:
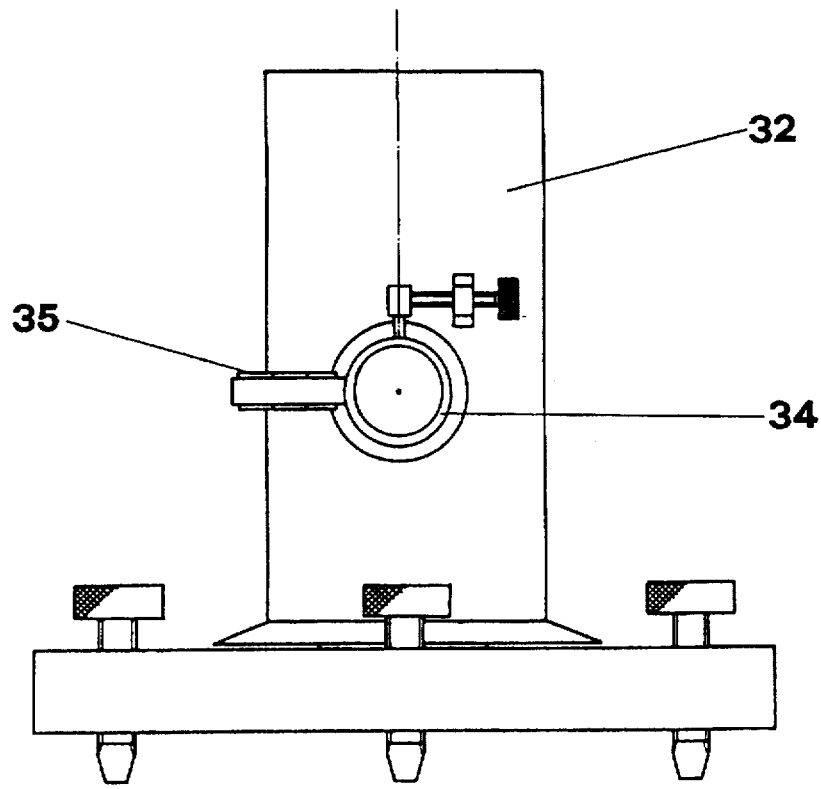
FIG. 8 is a front elevational view of another embodiment of the device of the present invention, with an external member provided with a prism capable of splitting the ray, in a first working position, with the ray split upwardly.
Figure 9:
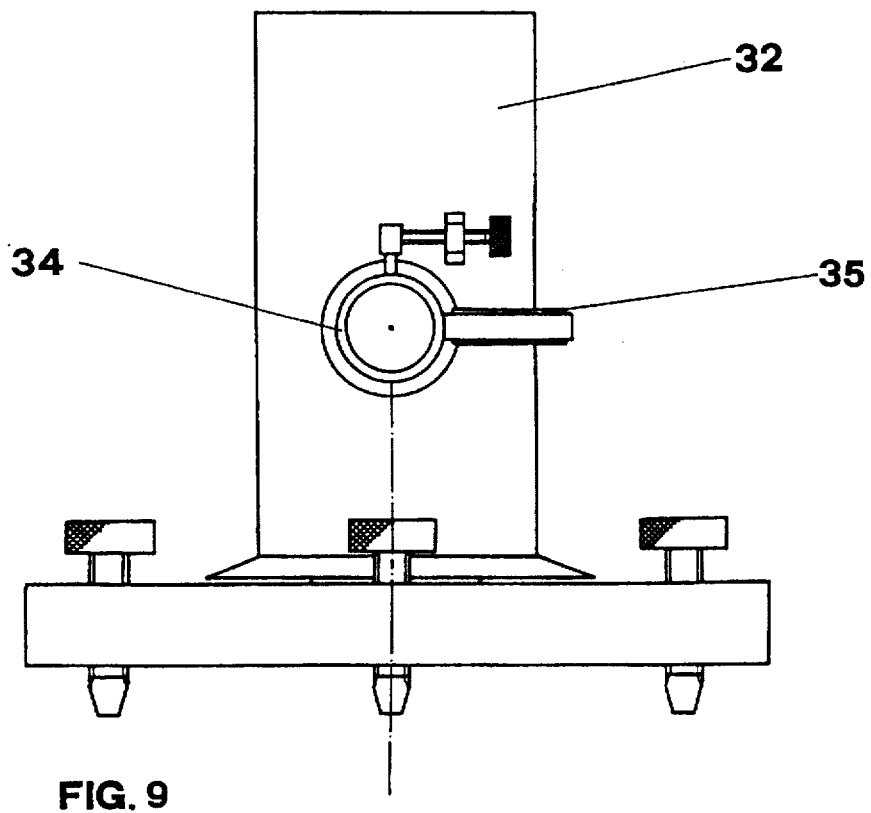
FIG. 9 is a front elevational view of the embodiment of FIG. 8 in a second working position, with the ray split downwardly.
Figure 10:
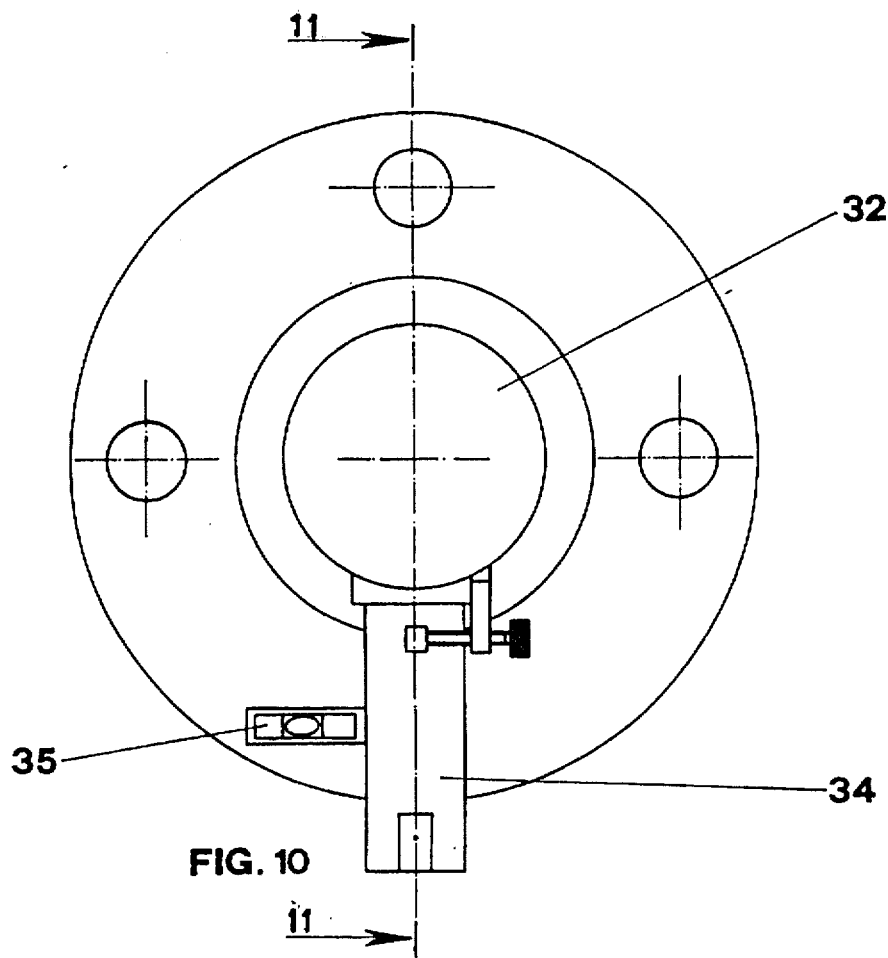
FIG. 10 is a top view of the embodiment of FIG. 8.
Figure 11:
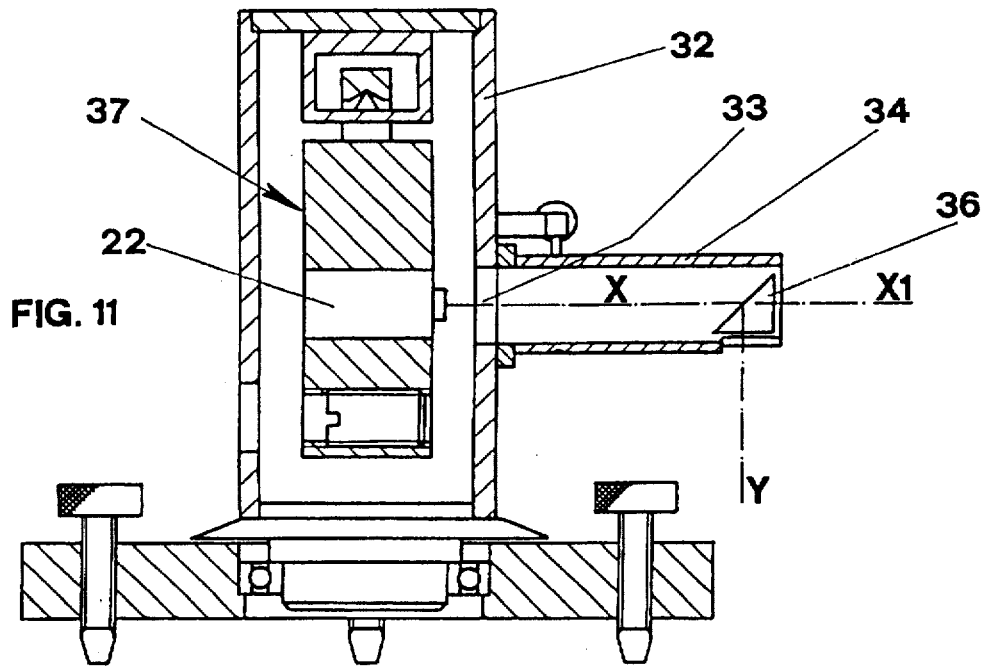
FIG. 11 is a vertical cross-sectional view taken along line 11—11 of FIG. 10.

As seen in FIG. 7, a spider may be used for supporting the weight (23), the spider has pointed members (28) and (29) which are arranged perpendicular to pointed members (30) and (31). The pointed members enter into and are supported by the conically shaped cross-pieces.

FIGS. 8–11 illustrate another embodiment of the present invention. Member (34) is applied on the sleeve corresponding to the opening (33) from which the laser ray exits. Member (34) is provided with prism (36) having known optical properties. In this manner, the original laser ray X shown in FIG. 11 emitted by the emitting device mounted on the oscillating group (37) is split into two rays, ray X1 being disposed on the continuation of the original ray X while ray Y is oriented at 90° with respect to ray X.

It is advantageous to cause member (34) to rotate manually or in an automated manner on its axis perpendicular to the axis of the sleeve (32) in such a manner that, with the rotation of member (34), the second ray Y pinpoints a place perpendicular to the axis of ray X1.

In view of the fact that in the rest position of the oscillating group (37), the ray X is in a perfectly horizontal position, the ray Y which is obtained by splitting at 90° due to the prism, is always in a perfectly vertical plane. Further, for the purpose of ascertaining that the ray Y is always in a perfectly vertical position when the oscillating group (37) is in the rest position, there is provided that the revolving member (34) which carries the prism has at least one precision glass tube (35) which is positioned with its axis at 90° with respect to the ray Y but not coinciding with the direction of the X ray, and in such a manner that the same glass tube is visible even if rotated by 180°.

In this manner, in the equilibrium position of the oscillating group (37) and the glass tube (35), the ray Y which has been formed by splitting by the action of the prism, lies in a perfectly vertical position and may, due to the rotation of member (34), project the ray Y in an upward or downward direction. Thus, one obtains the vertical straight line which joins for instance two opposite points respectively on the ceiling and on the floor.

In order to facilitate and to improve the positioning of the glass tube in its equilibrium position, there is provided a micrometric regulation of the rotation of member (34) by means of a micrometer adjustor (38).

It is also possible to provide a system of pointed oscillations which touch within the vertex of the recesses of conical shape which are formed on members of regulatable position as shown in FIG. 7 where points (28) and (29) are disposed perpendicularly to the points (30) and (31).

Clearly the constructive details of the device of the present invention may be carried out in a different manner from the manner illustrated in the embodiments described hereinabove while keeping the essential characteristics of the device the same.

What is claimed is:

1. A device self-leveling for projecting laser rays in a horizontal position on a wall, said device having an oscillating apparatus, said device comprising a sleeve (1), a base (10), said base (10) including means for permitting the rotation of said sleeve (1), a universal joint located within said sleeve, said universal joint supporting said oscillating apparatus which is self-leveling under the force of gravity and which includes an oscillating stem (3) connected to said universal joint, a source of laser rays (4) orthogonal to and carried by said stem (3), a weight (5) connected to said stem (3) beneath said source of laser rays (4), said oscillating stem (3), said source of laser rays (4) and said weight (5) being free to oscillate under the action of said universal joint, a mechanical means for interrupting the oscillations of said weight (5), said mechanical means comprising a blade (8) movably mounted on said sleeve (1) for contact with said weight (5), a cam (7) operatively engaging said blade (8) actuated by a lever (6) to move said blade (8) into contact with said weight (5), and a spring (9) biasing said lever (6) so as to normally separate said blade (8) from said weight (5), a screw (13) located on said weight (5) for regulating the position of said laser rays, so that said laser rays are always projected in a horizontal position on a wall when the oscillating apparatus is in equilibrium, said sleeve (1) being connected with a graduated ringnut (11) whereby upon rotation of said sleeve the angular displacement of said laser rays from a reference on said base (10) can be determined.

* * * * *